United States Patent
Capps

(12) 
(10) Patent No.: US 10,801,226 B2
(45) Date of Patent: Oct. 13, 2020

(54) COMBINATION POOL HOOK AND WATER TESTER

(71) Applicant: Carl Capps, Birmingham, AL (US)

(72) Inventor: Carl Capps, Birmingham, AL (US)

( * ) Notice: Subject to any disclaimer, the term of this patent is extended or adjusted under 35 U.S.C. 154(b) by 138 days.

(21) Appl. No.: 16/260,291

(22) Filed: Jan. 29, 2019

(65) Prior Publication Data

US 2020/0240164 A1    Jul. 30, 2020

(51) Int. Cl.
*E04H 4/14*    (2006.01)
*B25J 1/04*    (2006.01)
*G01N 1/12*    (2006.01)
*E04H 4/12*    (2006.01)
*G01N 31/22*    (2006.01)

(52) U.S. Cl.
CPC ...... *E04H 4/14* (2013.01); *B25J 1/04* (2013.01); *E04H 4/1272* (2013.01); *G01N 1/12* (2013.01); *G01N 31/221* (2013.01)

(58) Field of Classification Search
CPC ........ G01N 1/12; G01N 31/221; G01N 33/18; E04H 4/14; E04H 4/1272; B25J 1/04
See application file for complete search history.

(56) References Cited

U.S. PATENT DOCUMENTS

| | | | |
|---|---|---|---|
| 2,004,568 A * | 6/1935 | Carpinello | G01N 1/12 73/863.31 |
| 3,675,491 A * | 7/1972 | Guillet | G01N 1/08 73/864.63 |
| 4,263,864 A | 4/1981 | Carter, Jr. | |
| 4,515,023 A * | 5/1985 | Kershner | G01N 1/12 73/864.51 |
| 4,869,118 A * | 9/1989 | Keller | G01N 1/12 73/864.63 |
| 5,137,623 A | 8/1992 | Wall | |
| 5,442,970 A | 8/1995 | Hutchins | |
| D364,717 S | 11/1995 | Trapp | |
| 5,709,793 A | 1/1998 | Kisner | |
| 5,726,363 A * | 3/1998 | Kalidindi | G01N 1/14 73/864.13 |
| 6,644,137 B1 * | 11/2003 | Bellamy | G01N 1/12 73/864.63 |
| 7,014,231 B1 | 3/2006 | Callen | |
| 7,309,088 B2 | 12/2007 | Fiore | |

(Continued)

FOREIGN PATENT DOCUMENTS

| CA | 2292159 | * | 6/2000 | ............... G01N 1/12 |
| DE | 102009039488 | * | 8/2009 | ............... G01N 1/12 |

*Primary Examiner* — Natalie Huls

(57) ABSTRACT

A combination pool hook and water tester for pool maintenance without needing to reach or bend to water level includes a pole, a hook, and a bottle receptacle. The pole is tubular and has a side wall forming an inside, a hook end and a bottle end each open to the inside, a plurality of air inlet apertures proximal the hook end, and a plurality of water inlet apertures proximal the bottle end. The hook is selectively engageable within the hook end and is configured to secure and remove a pool skimmer lid, a pool skimmer basket, and a pool sweep. The bottle receptacle is selectively engageable with the bottle end. The bottle receptacle has a threaded end configured to receive a water test collection bottle. The plurality of water inlet apertures takes in water to fill the water test collection bottle when submerged.

9 Claims, 3 Drawing Sheets

(56) References Cited

U.S. PATENT DOCUMENTS

| | | | |
|---|---|---|---|
| 8,047,589 B1* | 11/2011 | Trainor | E04H 4/1609 |
| | | | 294/24 |
| 9,387,583 B1 | 7/2016 | Coan | |
| 2006/0005639 A1* | 1/2006 | Feller | G01N 1/12 |
| | | | 73/863.23 |
| 2009/0288503 A1* | 11/2009 | Breil | G01N 1/12 |
| | | | 73/864.63 |

* cited by examiner

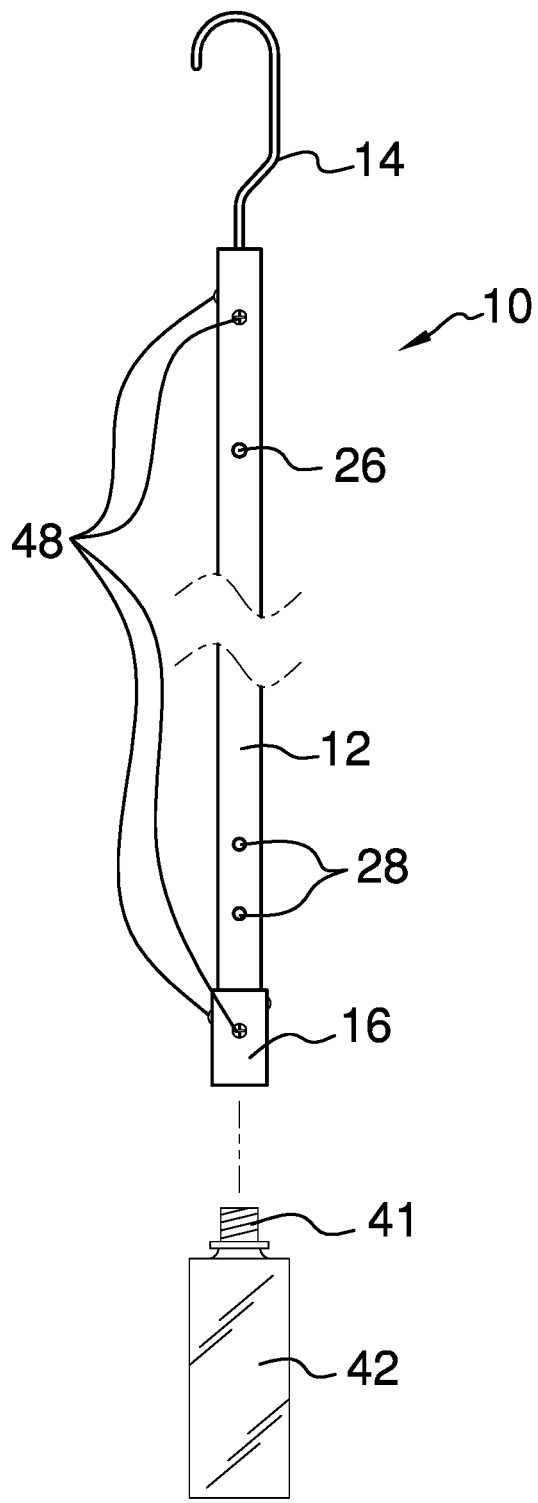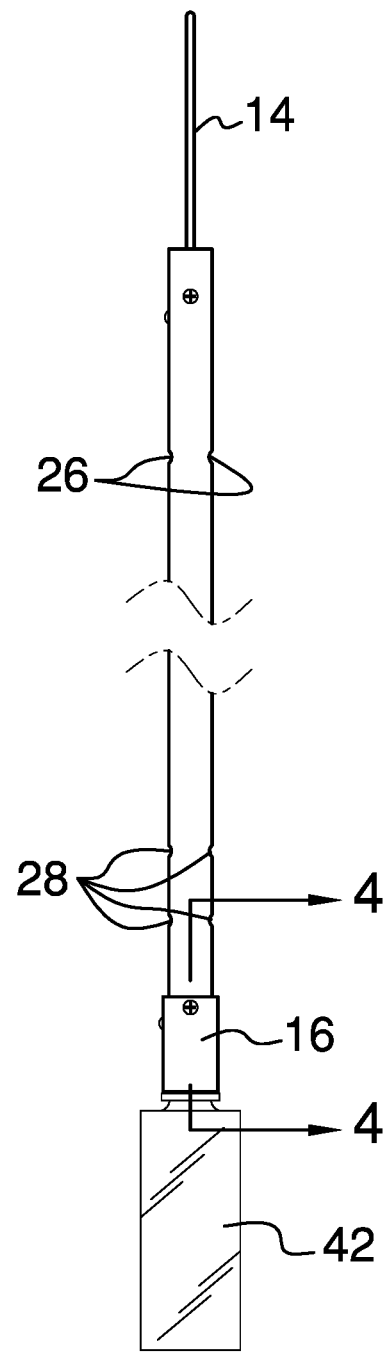
FIG. 1
FIG. 2

COMBINATION POOL HOOK AND WATER TESTER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art including information disclosed under 37 CFR 1.97 and 1.98.

The disclosure and prior art relates to pool maintenance tools and more particularly pertains to a new pool maintenance tool for pool maintenance without needing to reach or bend to water level.

BRIEF SUMMARY OF THE INVENTION

An embodiment of the disclosure meets the needs presented above by generally comprising a pole, a hook, and a bottle receptacle. The pole is tubular and has a side wall forming an inside, a hook end and a bottle end each open to the inside, a plurality of air inlet apertures proximal the hook end, and a plurality of water inlet apertures proximal the bottle end. The hook is selectively engageable within the hook end and is configured to secure and remove a pool skimmer lid, a pool skimmer basket, and a pool sweep. The bottle receptacle is selectively engageable with the bottle end. The bottle receptacle has a threaded end configured to receive a water test collection bottle. The plurality of water inlet apertures takes in water to fill the water test collection bottle when submerged.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a front elevation view of a combination pool hook and water tester according to an embodiment of the disclosure.

FIG. 2 is a side elevation view of an embodiment of the disclosure.

DETAILED DESCRIPTION OF THE INVENTION

Figure 3:
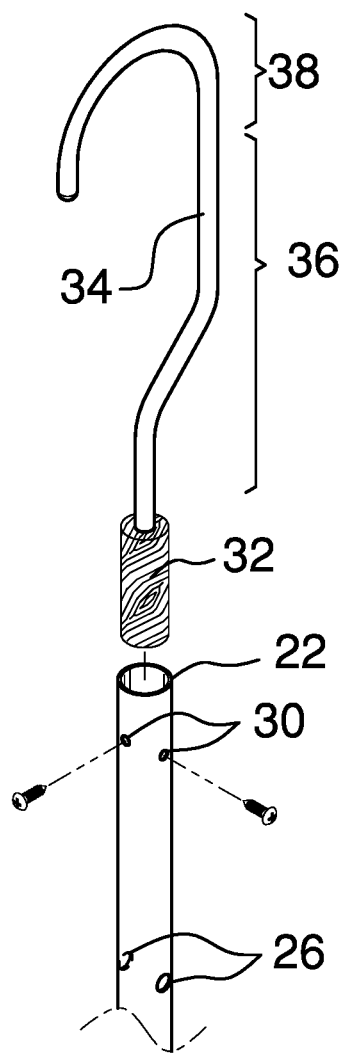
FIG. 3 is an isometric detail view of an embodiment of the disclosure.
Figure 4:
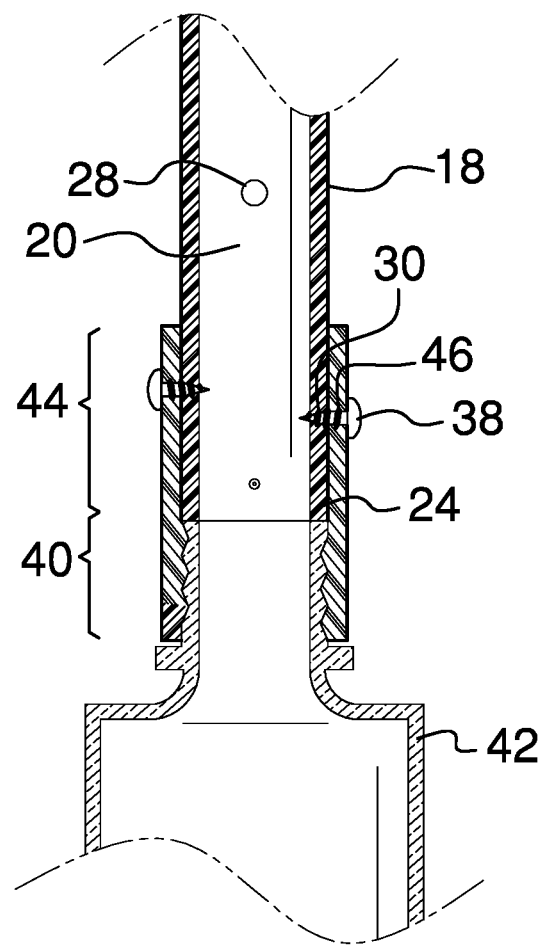
FIG. 4 is a cross-sectional view of an embodiment of the disclosure along line 4-4 of FIG. 2.
Figure 5:
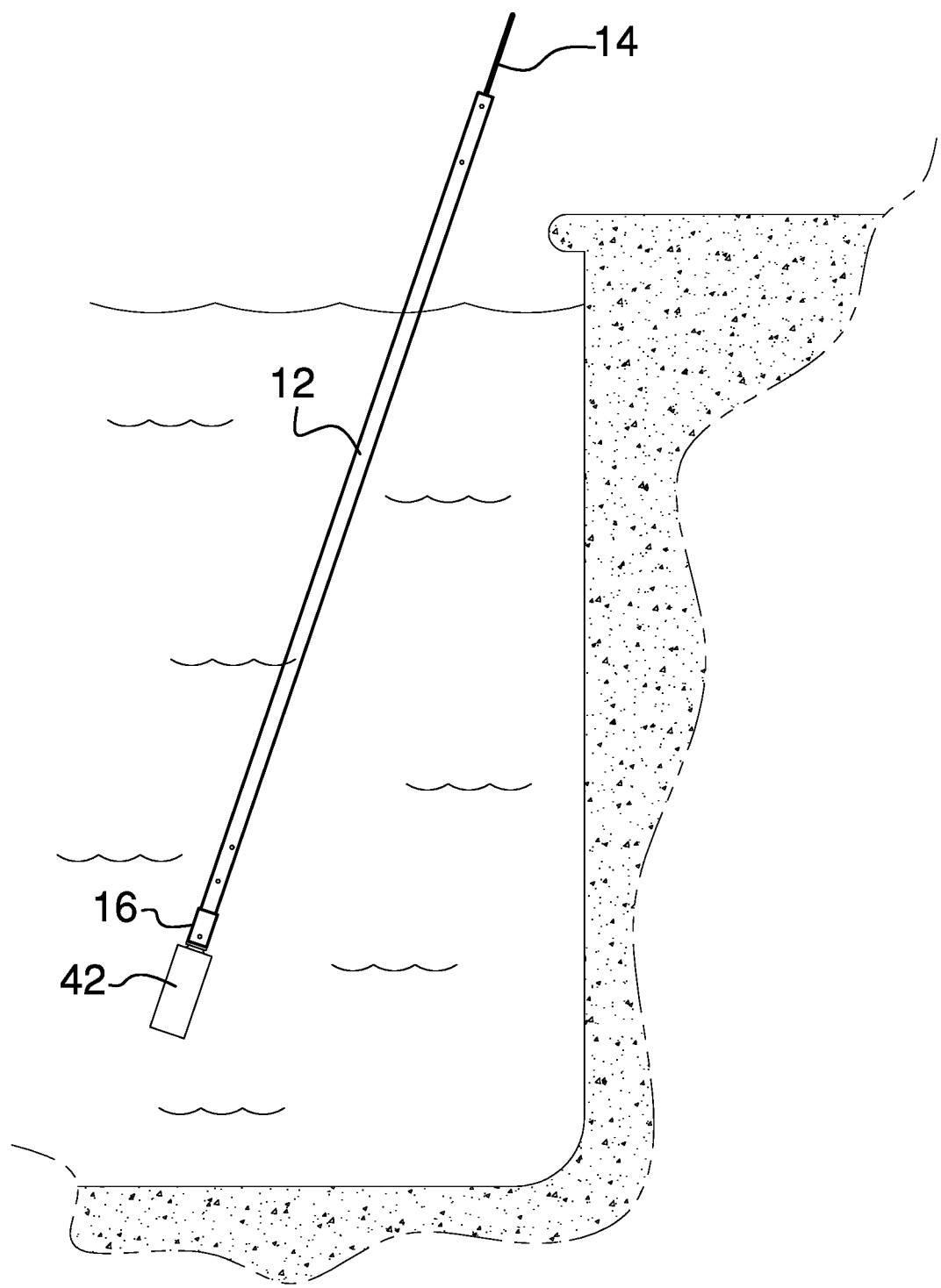
FIG. 5 is an in-use view of an embodiment of the disclosure.

With reference now to the drawings, and in particular to FIGS. 1 through 5 thereof, a new pool maintenance tool embodying the principles and concepts of an embodiment of the disclosure and generally designated by the reference numeral 10 will be described.

As best illustrated in FIGS. 1 through 5, the combination pool hook and water tester 10 generally comprises a pole 12, a hook 14, and a bottle receptacle 16. The pole 12 is tubular and has a side wall 18 forming an inside 20, a hook end 22 and a bottle end 24 each open to the inside 20, a plurality of air inlet apertures 26 proximal the hook end 22, and a plurality of water inlet apertures 28 proximal the bottle end 24. Each of the plurality of air inlet apertures 26 and the plurality of air inlet apertures 26 extends through the side wall 18 to the inside 20. The plurality of air inlet apertures 26 may be a pair of apertures on opposing sides of the pole 12 and the plurality of water inlet apertures 28 may be a set of four apertures comprising two pairs on opposing sides of the pole 12. The side wall 18 also has a plurality of mounting apertures 30 adjacent each of the hook end 22 and the bottle end 24.

The hook 14 has a shank portion 32 and a hooked portion 34. The shank portion 32 may be a cylindrical object such as a dowel rod that is slidably engageable within the hook end 22. The hooked portion 34 comprises an angled extension section 36 and a semicircular hook section 38. The bottle receptacle 16 is selectively engageable with the bottle end 24 of the pole. The bottle receptacle 24 has a threaded end 40 configured to receive a threaded neck 41 of a water test collection bottle 42. The bottle receptacle 24 is tubular and has an inner diameter substantially conforming to an outer diameter of the pole 12. The bottle receptacle 24 has a smooth portion 44 to receive the pole 12 with the threaded end 40 extending past the pole 12. The smooth portion 44 has a plurality of through holes 46 to align with the plurality of mounting apertures 30 proximal the bottle end 24. The plurality of mounting apertures 30 is configured to receive a plurality of fasteners 48 to secure the shank portion 32 of the hook and to secure the plurality of through holes 46 of the bottle receptacle. The plurality of fasteners 48 may be #6 stainless steel screws. The plurality of water inlet apertures 28 may have a 7/16" diameter and the plurality of air inlet apertures 26 may have a 9/16" diameter. The pole 12 may be a 3/4" Schedule 40 PVC pipe with a length of 4 feet.

In use, the hook 14 is configured to secure and remove a pool skimmer lid, a pool skimmer basket, and a pool sweep, and may also be used to retrieve other objects such as pool toys and floaties, all without having to bend down or reach into the water. The water test collection bottle 42 is attached to the threaded end 40 and is submerged so the plurality of water inlet apertures 28 takes in water to fill the water test collection bottle 42 with the plurality of air inlet apertures 26 allowing the water to flow. The water test collection bottle 42 may then be removed for testing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A combination pool hook and water tester comprising:
a pole, the pole being tubular and having side wall forming an inside, a hook end and a bottle end each open to the inside, a plurality of air inlet apertures proximal the hook end, and a plurality of water inlet apertures proximal the bottle end;
a hook coupled to the pole, the hook being selectively engageable within the hook end, the hook being configured to secure and remove a pool skimmer lid, a pool skimmer basket, and a pool sweep; and
a bottle receptacle coupled to the pole, the bottle receptacle being selectively engageable with the bottle end, the bottle receptacle having a threaded end configured to receive a water test collection bottle, wherein the plurality of water inlet apertures takes in water to fill the water test collection bottle when submerged.

2. The combination pool hook and water tester of claim 1 further comprising the side wall having a plurality of mounting apertures adjacent each of the hook end and the bottle end, the plurality of mounting apertures being configured to receive a plurality of fasteners to secure the hook and the bottle receptacle.

3. The combination pool hook and water tester of claim 2 further comprising the hook having a shank portion and a hooked portion, the shank portion being slidably engageable within the hook end of the pole, the shank portion being secured by the plurality of fasteners through the plurality of mounting apertures, the hooked portion comprising an angled extension section and a semicircular hook section.

4. The combination pool hook and water tester of claim 3 further comprising the shank portion being a dowel rod.

5. The combination pool hook and water tester of claim 2 further comprising the bottle receptacle being tubular and having an inner diameter substantially conforming to an outer diameter of the pole, the bottle receptacle having a smooth portion to receive the pole with the threaded end extending past the pole, the smooth portion having a plurality of through holes to align with the plurality of mounting apertures proximal the bottle end and to receive the plurality of fasteners.

6. The combination pool hook and water tester of claim 1 further comprising the plurality of air inlet apertures being a pair of apertures on opposing sides of the pole.

7. The combination pool hook and water tester of claim 1 further comprising the plurality of water inlet apertures being a set of four apertures comprising two pairs on opposing sides of the pole.

8. A combination pool hook and water tester comprising:
a pole, the pole being tubular and having side wall forming an inside, a hook end and a bottle end each open to the inside, a plurality of air inlet apertures proximal the hook end, the plurality of air inlet apertures being a pair of apertures on opposing sides of the pole, and a plurality of water inlet apertures proximal the bottle end, the plurality of water inlet apertures being a set of four apertures comprising two pairs on opposing sides of the pole, the side wall having a plurality of mounting apertures adjacent each of the hook end and the bottle end;
a hook coupled to the pole, the hook having a shank portion and a hooked portion, the shank portion being a dowel rod slidably engageable within the hook end, the hooked portion comprising an angled extension section and a semicircular hook section, the hook being configured to secure and remove a pool skimmer lid, a pool skimmer basket, and a pool sweep; and
a bottle receptacle coupled to the pole, the bottle receptacle being selectively engageable with the bottle end, the bottle receptacle having a threaded end configured to receive a water test collection bottle, the bottle receptacle being tubular and having an inner diameter substantially conforming to an outer diameter of the pole, the bottle receptacle having a smooth portion to receive the pole with the threaded end extending past the pole, the smooth portion having a plurality of through holes to align with the plurality of mounting apertures proximal the bottle end, wherein the plurality of water inlet apertures takes in water to fill the water test collection bottle when submerged; and
wherein the plurality of mounting apertures is configured to receive a plurality of fasteners to secure the shank portion of the hook and to secure the plurality of through holes of the bottle receptacle.

9. A combination pool hook and water tester comprising:
a pole, the pole being tubular and having side wall forming an inside, a hook end and a bottle end each open to the inside, a plurality of air inlet apertures proximal the hook end, the plurality of air inlet apertures being a pair of apertures on opposing sides of the pole, and a plurality of water inlet apertures proximal the bottle end, the plurality of water inlet apertures being a set of four apertures comprising two pairs on opposing sides of the pole, the side wall having a plurality of mounting apertures adjacent each of the hook end and the bottle end;

a hook coupled to the pole, the hook having a shank portion and a hooked portion, the shank portion being a dowel rod slidably engageable within the hook end, the hooked portion comprising an angled extension section and a semicircular hook section, the hook being configured to secure and remove a pool skimmer lid, a pool skimmer basket, and a pool sweep;

a water test collection bottle having a threaded neck; and a bottle receptacle coupled to the pole, the bottle receptacle being selectively engageable with the bottle end, the bottle receptacle having a threaded end to receive the threaded neck of the water test collection bottle, the bottle receptacle being tubular and having an inner diameter substantially conforming to an outer diameter of the pole, the bottle receptacle having a smooth portion to receive the pole with the threaded end extending past the pole, the smooth portion having a plurality of through holes to align with the plurality of mounting apertures proximal the bottle end, wherein the plurality of water inlet apertures takes in water to fill the water test collection bottle when submerged; and wherein the plurality of mounting apertures is configured to receive a plurality of fasteners to secure the shank portion of the hook and to secure the plurality of through holes of the bottle receptacle.

* * * * *